United States Patent
Kondo et al.

(10) Patent No.: US 10,509,375 B2
(45) Date of Patent: Dec. 17, 2019

(54) CONTROL DEVICE WITH CONSTANT CYCLE FOR A PLURALITY OF NETWORKS

(71) Applicant: FUJI CORPORATION, Chiryu (JP)

(72) Inventors: Hironori Kondo, Toyohashi (JP); Naohiro Kato, Okazaki (JP); Michinaga Onishi, Chiryu (JP)

(73) Assignee: FUJI CORPORATION, Chiryu (JP)

( * ) Notice: Subject to any disclaimer, the term of this patent is extended or adjusted under 35 U.S.C. 154(b) by 169 days.

(21) Appl. No.: 14/917,746

(22) PCT Filed: Sep. 30, 2013

(86) PCT No.: PCT/JP2013/076481
§ 371 (c)(1),
(2) Date: Mar. 9, 2016

(87) PCT Pub. No.: WO2015/045136
PCT Pub. Date: Apr. 2, 2015

(65) Prior Publication Data
US 2016/0216701 A1     Jul. 28, 2016

(51) Int. Cl.
*G05B 15/02*     (2006.01)
*H04L 12/40*    (2006.01)
(Continued)

(52) U.S. Cl.
CPC ........ *G05B 15/02* (2013.01); *H04L 12/40169* (2013.01); *H04L 67/325* (2013.01); *H04L 69/26* (2013.01); *H04L 2012/4026* (2013.01)

(58) Field of Classification Search
CPC ....... G05B 15/02; H04L 69/26; H04L 67/325; H04L 12/40169; H04L 2012/4026;
(Continued)

(56) References Cited

U.S. PATENT DOCUMENTS 3,934,262 A  *  1/1976  Snopko ................ H04N 5/7605
                                                     386/202
6,323,935 B1 * 11/2001 Ebihara ..................... G03F 7/20
                                                    310/12.06
(Continued)

FOREIGN PATENT DOCUMENTS

EP        1 468 791 A1     10/2004
EP        1468791 A1 *     10/2004    ............ B25J 9/1682
(Continued)

OTHER PUBLICATIONS

Extended European Search Report dated Aug. 23, 2016 in Patent Application No. 13894254.5.
(Continued)

*Primary Examiner* — Uyen B Tran
*Assistant Examiner* — Sultana Begum
(74) *Attorney, Agent, or Firm* — Oblon, McClelland, Maier & Neustadt, L.L.P.

(57) ABSTRACT

In a control device which outputs control instructions at a constant cycle to each of a plurality of networks for executing a predetermined process according to the control instructions, a time (a required time) from when the control instruction is output to each of the plurality of networks until the predetermined process is executed is acquired for each of the plurality of networks. Among the plurality of required times, a difference (a shift time) between a short required time (required time of mounting head) and a long required time (required time of moving device) is calculated. When the shift time has elapsed after outputting the control instruction to the network of the moving device, the control instruction is output to the network of the mounting head.

5 Claims, 5 Drawing Sheets

(51) Int. Cl.
*H04L 29/08* (2006.01)
*H04L 29/06* (2006.01)

(58) Field of Classification Search
CPC ...... F23N 2023/08; F23N 5/003; F23N 1/002; B01J 2208/00008
See application file for complete search history.

(56) References Cited

U.S. PATENT DOCUMENTS

| | | | |
|---|---|---|---|
| 6,519,109 B1* | 2/2003 | Price | G11B 5/5526 360/78.09 |
| 7,722,056 B2* | 5/2010 | Inoue | B60G 15/063 280/5.512 |
| 2003/0123041 A1* | 7/2003 | Tanaka | G03F 7/70716 355/72 |
| 2005/0055132 A1 | 3/2005 | Matsumoto et al. | |
| 2005/0110897 A1* | 5/2005 | Wakabayashi | H04N 5/2254 348/362 |
| 2005/0237012 A1* | 10/2005 | Numauchi | G05B 19/19 318/85 |
| 2006/0002341 A1* | 1/2006 | Bejerano | H04L 45/12 370/329 |
| 2007/0175540 A1* | 8/2007 | Anderson | B65B 39/004 141/130 |
| 2012/0057479 A1 | 3/2012 | Maruyama et al. | |
| 2016/0291572 A1* | 10/2016 | Kato | G05B 11/01 |

FOREIGN PATENT DOCUMENTS

| | | |
|---|---|---|
| JP | 2007-274553 A | 10/2007 |
| JP | 2012-60207 A | 3/2012 |

OTHER PUBLICATIONS

Brendan Galloway, et al. "Introduction to Industrial Control Networks" IEEE Communications Surveys & Tutorials, vol. 15, No. 2, Second Quarter, XP011508072, 2013, pp. 860-880.

International Search Report dated Jan. 7, 2014 in PCT/JP2013/076481 filed Sep. 30, 2013.

Office Action dated Jun. 5, 2018 in Chinese Patent Application No. 201380079797.2 (submitting English language translation only), 5 pages.

* cited by examiner

CONTROL DEVICE WITH CONSTANT CYCLE FOR A PLURALITY OF NETWORKS

TECHNICAL FIELD

The present application relates to a control device which outputs control instructions at a constant cycle to each of a plurality of networks for executing predetermined processes according to the control instructions.

BACKGROUND ART

In a network system of communication, control, and the like, a network such as Ethernet (registered trademark), MECHATROLINK (registered trademark), or EtherCAT (registered trademark) is adopted, in each of the networks, predetermined processes are executed according to the control instructions from the control device. In detail, for example, in a case in which an actuator such as a drive circuit or a servo motor is included in a single network, the operation of the actuator is controlled according to the control instructions. In this case, in a case in which a plurality of actuators are included in a single network, it is demanded that the plurality of actuators operate in synchronization, that is, that no shifting occurs in the operation timing of the plurality of actuators. Therefore, in the network system described in the patent literature which is described below, in consideration of an activation delay or the like of the actuators, by outputting the control instructions to the plurality of actuators in a batch to match the activation timing of the actuator which requires the most time for activation, the control device operates the plurality of actuators in synchronization.

CITATION LIST

Patent Literature

PTL 1: JP-A-2012-60207

BRIEF SUMMARY

Problem to be Solved

According to the network system described in the patent literature which is described above, it is possible to operate a plurality of actuators in a single network in synchronization. However, there is a case in which a single control device outputs control instructions to a plurality of networks, and in this case, even if the technique described above is applied, it is not possible to operate the actuators of a plurality of networks in synchronization, even if it is possible to operate a plurality of actuators in each of the networks in synchronization. The present application was made in light of this issue, and an object thereof is to provide a control device capable of operating actuators of a plurality of networks in synchronization in a case in which a single control device outputs control instructions to a plurality of networks.

Means for Solving the Problem

In order to solve the problem described above, an aspect of the disclosure provides a control device which outputs control instructions at a constant cycle to each of a plurality of networks for executing a predetermined process according to the control instructions, the control device including a required time acquisition section that, for each of the plurality of networks, acquires a required time which is a time from when a control instruction is output to each of the plurality of networks until the predetermined process is executed by each of the plurality of networks, a shift time calculating section which calculates a shift time which is a difference between a shortest required time which is the shortest of the required times of the plurality of networks, and a required time other than the shortest required time of the required times of the plurality of networks, and a control instruction output section which, when the shift time has elapsed after the control instruction is output to a first network, outputs the control instruction to a network other than the first network in which the required time is the shortest required time of the plurality of networks.

Another aspect of the disclosure provides the control device, in which communication protocols of the plurality of networks are different from each other.

Another aspect of the disclosure provides the control device, in which each of the plurality of networks includes at least one drive circuit which receives the control instruction as an input signal, and an actuator which operates according to an output signal from the drive circuit, and in which the required time acquisition section acquires, as the required time, a total time of a time from when the control device outputs a control instruction until the drive circuit outputs an output signal and a time from when the drive circuit outputs the output signal until the actuator operates.

Another aspect of the disclosure provides the control device, in which a single network of the plurality of networks is used in control of a work head which performs work in a manufacturing work machine, and in which a network other than the single network of the plurality of networks is used in control of a head moving device which moves the work head to an arbitrary position on a base of the manufacturing work machine.

Another aspect of the disclosure provides the control device, in which a single network of the plurality of networks is used in control of an up-down direction moving device that moves a work tool of a work head which performs work in a manufacturing work machine in up-down directions, and in which a network other than the single network of the plurality of networks is used in control of an operation device which operates the work tool in a different mode from an operation mode of the up-down direction moving device.

Effects

In the control device according to an aspect of the disclosure, a time (hereinafter, there are cases in which this is described as the "required time") from when the control instruction is output to each of the plurality of networks until the predetermined process is executed is acquired for each of the plurality of networks. A difference (hereinafter, there are cases in which this is described as the "shift time") between the shortest required time (hereinafter, there are cases in which this is described as the "minimum required time") of the required times of the plurality of networks and a required time other than the minimum required time of the required times of the plurality of networks is calculated. The control device outputs the control instruction to the network other than the network (hereinafter, there are cases in which this is referred to as the "first network") in which the required time is the minimum required time of the plurality of networks when the shift time has elapsed after the control instruction is output to the first network. In other words, the control device shifts and outputs the control instructions to the plurality of networks in consideration of each of the required times of the plurality of networks. Accordingly, the processes of the plurality of networks are executed in synchronization, and, for example, it is possible to operate the actuators of the plurality of networks in synchronization.

In the control device according to another aspect of the disclosure, the communication protocols of the plurality of networks are different from each other. Here, a "communication protocol" defines the stipulations, the procedures, the rules, and the like relating to communication, and a "communication protocol" includes not only the stipulations and the like of the data itself which is communicated, but also the stipulations of the transmission paths of data or the like, specifically, in the case of wired communication, includes stipulations and the like of the types of cables and connectors or the like, and in the case of wireless communication, includes stipulations and the like of frequency bands or the like. Therefore, in the plurality of networks with different communication protocols, there is a case in which the required time is greatly different. Therefore, in the control device according to another aspect of the disclosure, the effect of shifting and outputting the control instructions to the plurality of networks in consideration of each of the required times of each of the plurality of networks is sufficiently utilized.

In the control device according to another aspect of the disclosure, the drive circuits and the actuators are included in the network. The total time of the time from when the control device outputs the control instruction until the drive circuit outputs the output signal, and the time from when the drive circuit outputs the output signal until the actuator operates is the required time. Accordingly, it is possible to appropriately synchronize and operate the actuators of the plurality of networks in synchronization.

In the control device according to another aspect of the disclosure, a single network of the plurality of networks is used in control of a work head which performs work in a manufacturing work machine, and a network other than the single network of the plurality of networks is used in control of a head moving device which moves the work head to an arbitrary position on a base of the manufacturing work machine. The work head and the head moving device often perform predetermined work in cooperation, and the synchronized operation of the work head and the head moving device is extremely useful. Therefore, in the control device according to another aspect of the disclosure, the effect of synchronizing and executing the processes in each of the plurality of networks is sufficiently utilized.

In the control device according to another aspect of the disclosure, a single network of the plurality of networks is used in control of an up-down direction moving device that moves a work tool of a work head which performs work in a manufacturing work machine in up-down directions, and a network other than the single network of the plurality of networks is used in control of an operation device which operates the work tool in a different mode from an operation mode of the up-down direction moving device. During the work of the work head, the up-down direction moving device and the operation device often perform predetermined work in cooperation, and the synchronized operation of the up-down direction moving device and the operation device is extremely useful. Therefore, in the control device according to another aspect of the disclosure, the effect of synchronizing and executing the processes in each of the plurality of networks is sufficiently utilized.

DESCRIPTION OF EMBODIMENTS

Hereinafter, detailed description will be given of the example of the present disclosure with reference to the drawings as a mode for carrying out the present disclosure.
<Configuration of Electronic Component Mounting Device>

Figure 1:
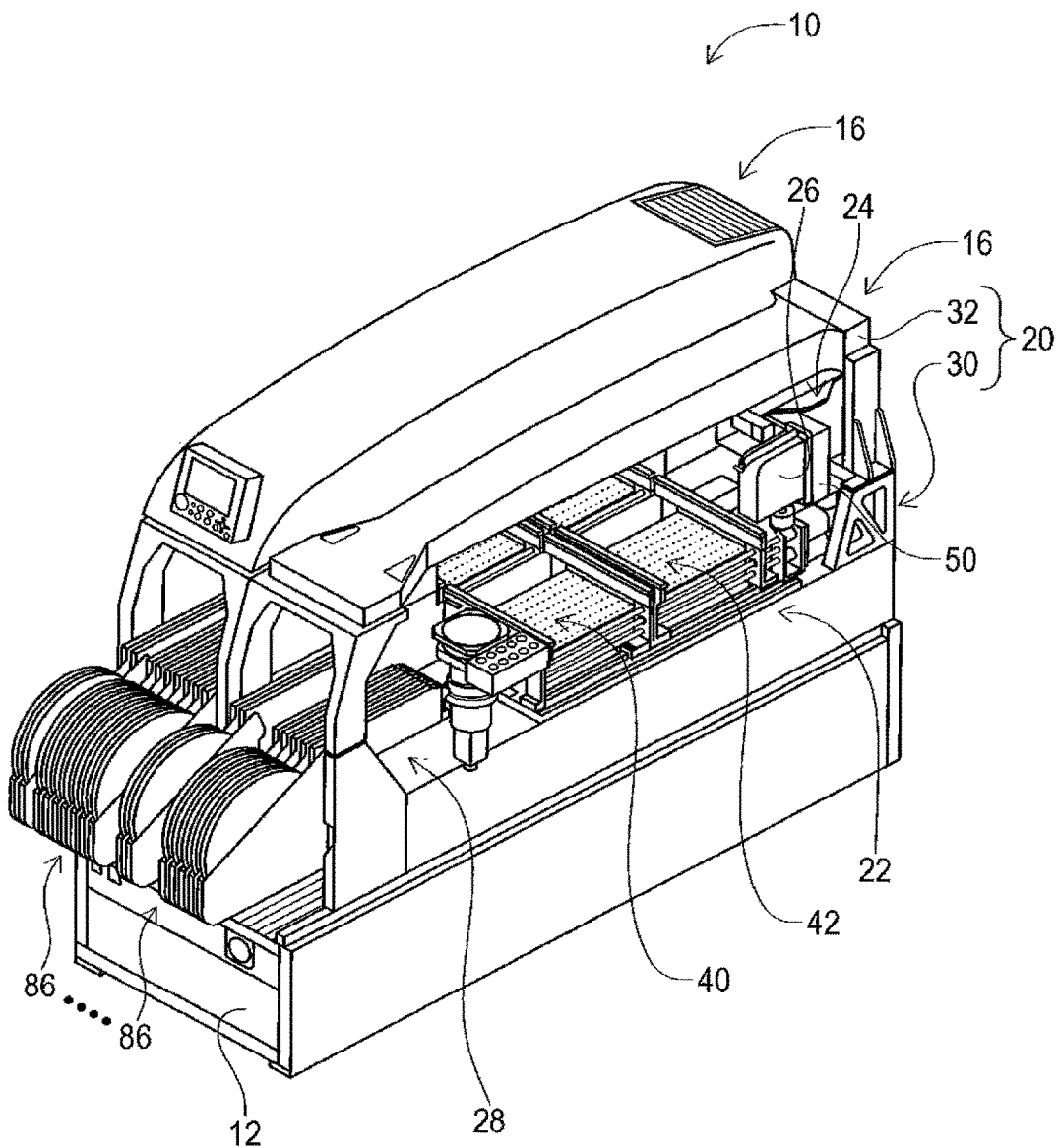
FIG. 1 is a perspective diagram illustrating an electronic component mounting device which is an example of the present disclosure.

FIG. 1 illustrates an electronic component mounting device 10. The electronic component mounting device 10 includes one system base 12, and two mounting machines 16 which are installed on the system base 12 to line up. Note that, in the following description, directions in which the mounting machines 16 are lined up will be referred to as X-axis directions, and horizontal directions at a right angle to the X-axis directions will be referred to as Y-axis directions.

Each of the mounting machines 16 is provided with a mounting machine main body 20, a conveyance device 22, a mounting head moving device (hereinafter, there are cases in which this is shortened to a "moving device") 24, a mounting head 26, and a supply device 28. The mounting machine main body 20 is formed of a frame section 30, and a beam section 32 which bridges over the frame section 30.

The conveyance device 22 is provided with two conveyor devices 40 and 42. The two conveyor devices 40 and 42 are installed on the frame section 30 to be parallel to each other and to extend in the X-axis directions. Each of the two conveyor devices 40 and 42 convey circuit boards which is supported by the respective conveyor device 40 or 42 in the X-axis directions using an electromagnetic motor (refer to FIG. 3) 46. The circuit board is held in a predetermined position in a fixed manner by a board holding device (refer to FIG. 3) 48.

The moving device 24 is an XY robot-type moving device. The moving device 24 is provided with an electromagnetic motor (refer to FIG. 3) 52 which causes a slider 50 to slide in the X-axis directions, and an electromagnetic motor (refer to FIG. 3) 54 which causes the slider 50 to slide in the Y-axis directions. The mounting head 26 is attached to the slider 50, and the mounting head 26 moves to an arbitrary position above the frame section 30 due to the operation of the two electromagnetic motors 52 and 54.

Figure 2:
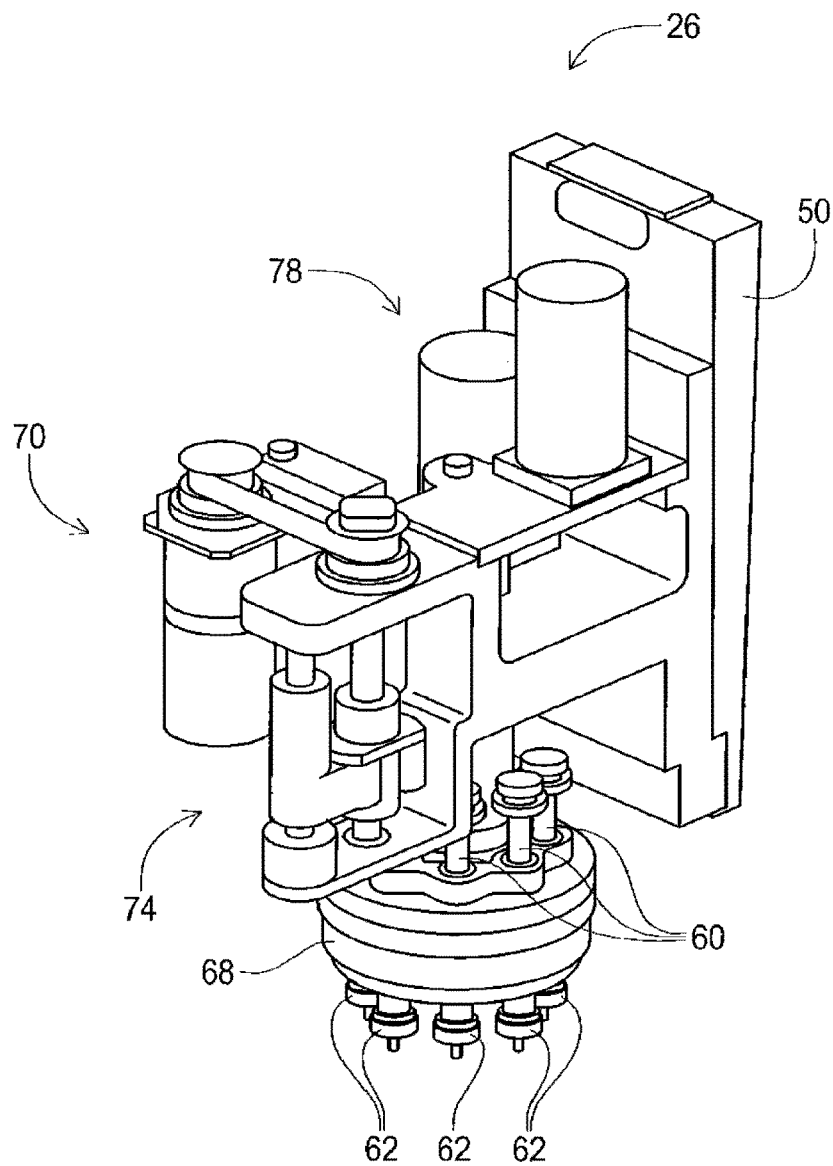
FIG. 2 is a perspective diagram illustrating a mounting head with which the electronic component mounting device of FIG. 1 is provided.

The mounting head 26 mounts the electronic component on the circuit board. As illustrated in FIG. 2, the mounting head 26 is provided with a plurality of rod-shaped mounting unit 60, and a suction nozzle 62 is mounted to the tip portion of each of the plurality of mounting units 60. The suction nozzle 62 communicates with a positive and negative pressure supply device (refer to FIG. 3) 66 via negative air and positive air paths. The suction nozzle 62 sucks and holds the electronic component using a negative pressure and releases the held electronic component using a positive pressure. The plurality of rod-shaped mounting units 60 are held on the outer circumferential portion of a unit holding body 68 in a state of being at an equal angle pitch and the axial direction being vertical, the suction nozzles 62 extend downward from the bottom surface of the unit holding body 68.

The unit holding body 68 intermittently rotates at the installation angle of the mounting units 60 each time due to an electromagnetic motor (refer to FIG. 3) 72 of a holding body rotation device 70. Accordingly, the mounting units 60 sequentially stop at a lifting and lowering station (the station positioned closest to the front) which is one stopping position among the stopping positions of the plurality of mounting units 60. The mounting unit 60 which is positioned at the lifting and lowering station is lifted and lowered by an electromagnetic motor (refer to FIG. 3) 76 of a unit lifting and lowering device 74. Accordingly, the position in the up-down directions of the electronic component which is sucked and held by the suction nozzle 62 is changed. The stopping positions other than the lifting and lowering station are turning stations, and the mounting units 60 which are positions in those stations turn due to an electromagnetic motor (refer to FIG. 3) 80 of a turning device 78. Accordingly, the holding orientation of the electronic component which is sucked and held by the suction nozzle 62 is changed.

The supply device 28 is a feeder-type supply device and is installed on the end portion of the front side of the frame section 30. The supply device 28 includes a tape feeder 86. The tape feeder 86 contains taped components in a wound state. The taped components are obtained by taping the electronic components. The tape feeder 86 feeds out the taped components using a feed device (refer to FIG. 3) 88. Accordingly, the feeder-type supply device 28 supplies the electronic components to the supply position by feeding out the taped components. Note that, the tape feeder 86 can be attached to and detached from the frame section 30, and it is possible to adapt for the exchanging of the electronic components.

Figure 3:
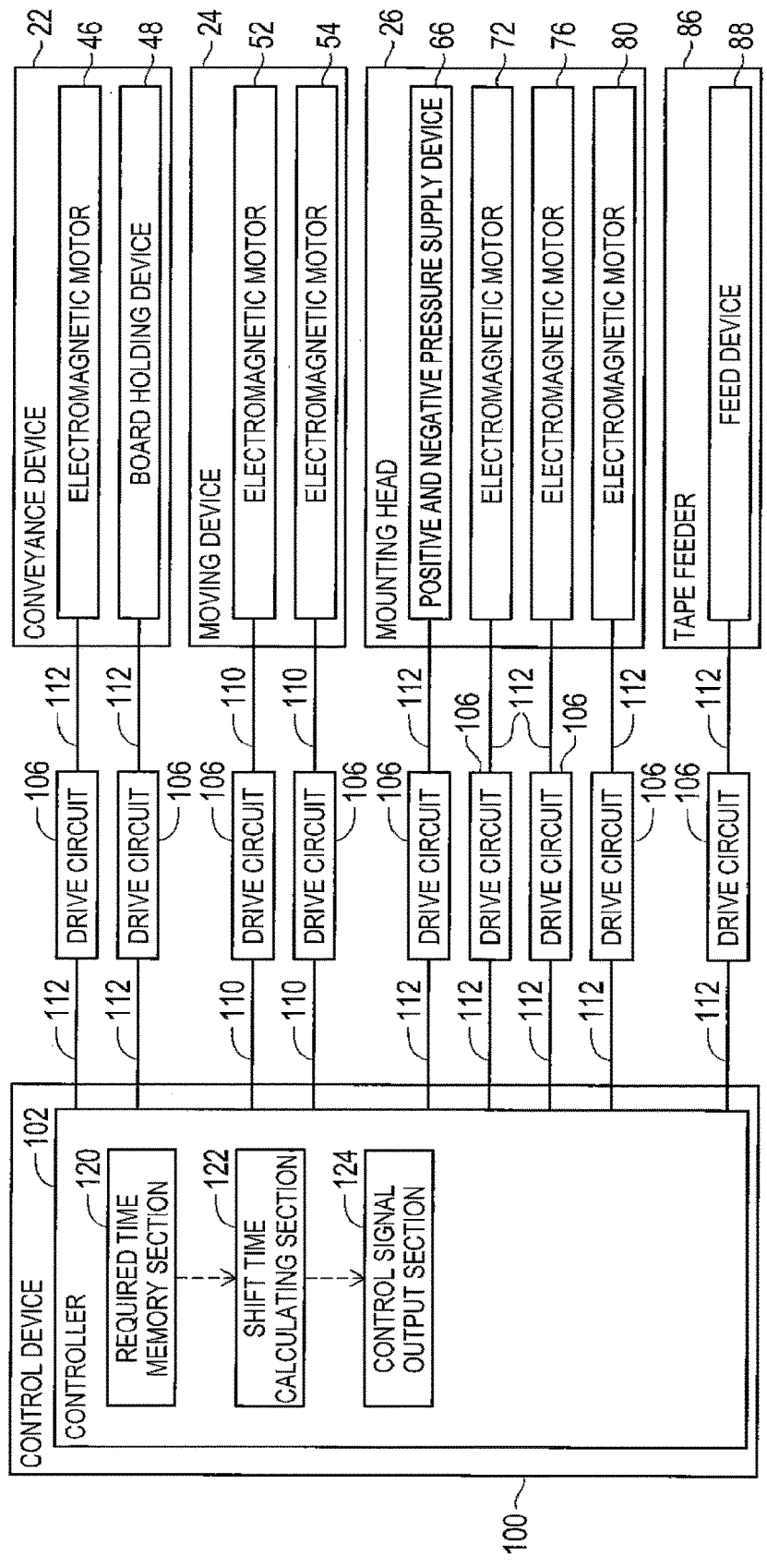
FIG. 3 is a block diagram illustrating a control device with which the electronic component mounting device of FIG. 1 is provided.

As illustrated in FIG. 3, the mounting machine 16 is provided with a control device 100. The control device 100 includes a controller 102, the controller 102 is provided with a CPU, a ROM, a RAM, and the like, and the main constituent of the controller 102 is a computer. The controller 102 is connected to a plurality of drive circuits 106, and the plurality of drive circuits 106 are connected to the electromagnetic motors 46, 52, 54, 72, 76, and 80, the board holding device 48, the positive/negative pressure supply device 66, and the feed device 88. Accordingly, the operations of the conveyance device 22, the moving device 24, and the like are controlled by the controller 102.

Note that, the electromagnetic motors 52 and 54 of the moving device 24 are connected to the drive circuit 106, and the drive circuit 106 is connected to the controller 102 using a network which conforms to a predetermined communication protocol (hereinafter, there are cases in which the communication protocol is described as a "first communication protocol"), for example, using a cable 110 which supports Ethernet (registered trademark). The electromagnetic motors 46, 72, 76, and 80 of the conveyance device 22, the mounting head 26, and the tape feeder 86, the board holding device 48, the positive and negative pressure supply device 66, and the feed device 88 are connected to the drive circuits 106, and the drive circuits 106 are connected to the controller 102 using cables 112 which support a network which conforms to a different communication protocol (hereinafter, there are cases in which this is described as a "second communication protocol") from the first communication protocol. This is because there is demand for extremely high precision at high speed in the positional control of the mounting head 26 by the moving device 24, and a network capable of realizing high precision, high speed control is adopted in the moving device 24.

<Mounting Operation by Mounting Machine>

According to the configuration which is described above, in the mounting machine 16, it is possible to perform the mounting operation on the circuit board which is held by the conveyance device 22 using the mounting head 26. Specifically, according to the instructions of the controller 102, the circuit board is conveyed to a working position, and at this position, is held in a fixed manner by the board holding device 48. The tape feeder 86 feeds the taped components and supplies the electronic components to the supply position according to the instructions of the controller 102. The mounting head 26 moves to above the supply position of the electronic components and sucks and holds the electronic component using the suction nozzle 62 according to the instructions of the controller 102. Next, the mounting head 26 moves to above the circuit board according to the instructions of the controller 102. Using the operations of the unit lifting and lowering device 74, the turning device 78, and the like, the mounting head 26 adjusts the position in the up-down directions of the held electronic component, the holding orientation of the electronic component, and the like, and mounts the electronic component in a predetermined position on the circuit board.

<Synchronization of Electromagnetic Motor in Each Moving Device and Mounting Head>

As described above, in the mounting machine 16, during the mounting operation of an electronic component, the positional control in the X-axis directions and the Y-axis directions of the mounting head 26 is performed by the moving device 24. Therefore, it is desirable that the electromagnetic motor 52 for moving the slider 50 in the X-axis directions and the electromagnetic motor 54 for moving the slider 50 in the Y-axis directions are operated in synchronization. The electromagnetic motor 52 and the electromagnetic motor 54 operating in synchronization means that shifting does not occur in the operation timing of the electromagnetic motor 52 and the electromagnetic motor 54.

Figure 4:
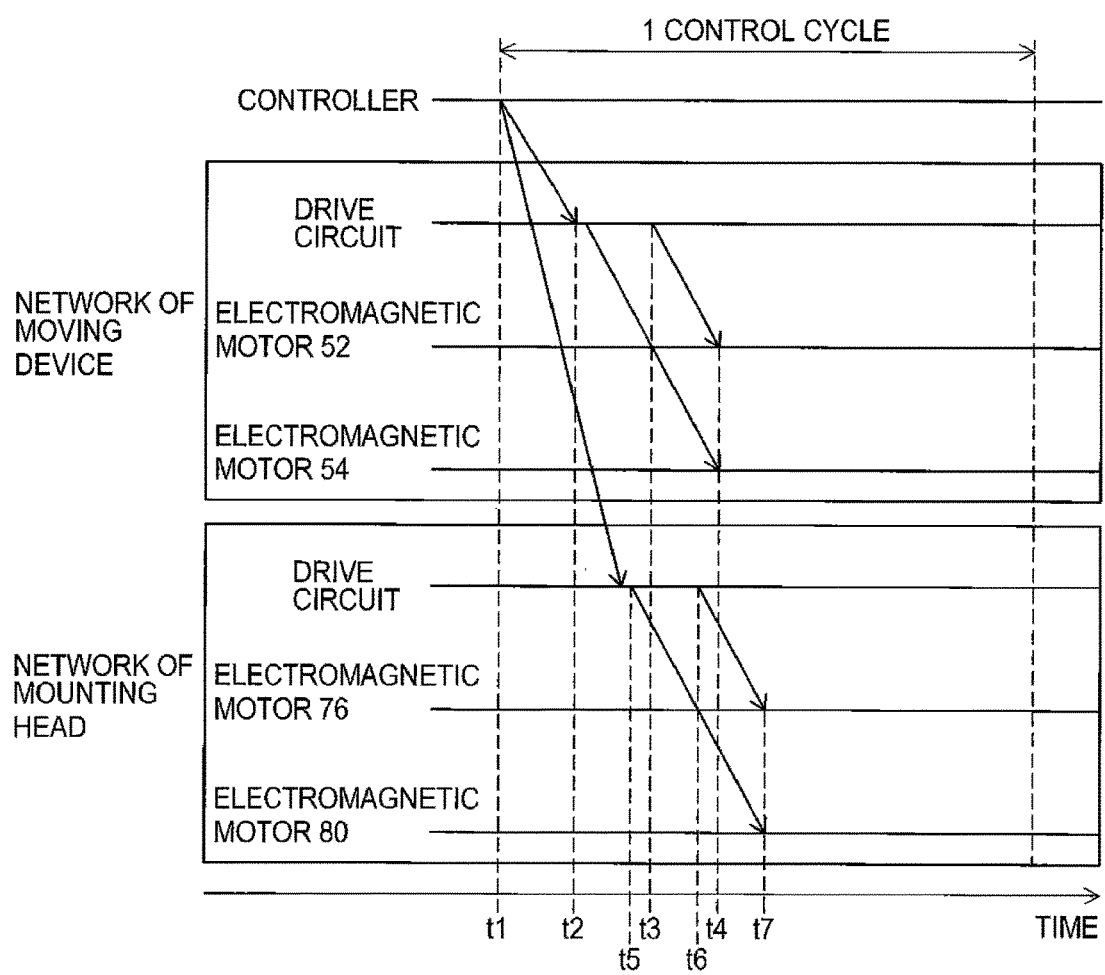
FIG. 4 is a diagram schematically illustrating a transmission mode of control instructions to a plurality of electromagnetic motors in a network of the related art.

Therefore, in the mounting machine 16, the synchronization in the operations of the electromagnetic motor 52 and the electromagnetic motor 54 of the moving device 24 is secured according to the network which is used in the control of the moving device 24, that is, according to the first communication protocol of the network which is formed of the cable 110 which is used in the transmission of control signals and the like to the moving device 24, and the drive circuit 106 of the moving device 24. In detail, the control signals are transmitted from the controller 102 to the drive circuit 106 corresponding to the moving device 24 every specific cycle; however, for example, as illustrated in FIG. 4, in a case in which control signals are transmitted from the controller 102 to the drive circuits 106 corresponding to the moving device 24 at a time t1, the drive circuits 106 receive the control signals as input signals, and transmit output signals to the electromagnetic motors 52 and 54 of the moving device 24. In this case, the drive circuit 106 transmits a control signal to the electromagnetic motor 54 according to the first communication protocol at a time t2, and transmits a control signal to the electromagnetic motor 52 at a time t3 (>t2). This is because, due to the activation delay or the like of the motors, the time from when the drive circuit 106 outputs a control signal until the electromagnetic motor 54 starts operating is longer than the time from when the drive circuit 106 outputs the control signal until the electromagnetic motor 52 starts operating, and the drive circuit 106 transmits to each of the electromagnetic motors 52 and 54 with shifted output times according to the first communication protocol. Accordingly, the electromagnetic motors 52 and 54 start operating at a time t4, and the electromagnetic motor 52 and the electromagnetic motor 54 of the moving device 24 operate in synchronization.

During the mounting operation of the electronic component, as described above, the control of the position in the up-down direction of the electronic component and the holding orientation of the electronic component is performed by the mounting head 26. Therefore, it is desirable that the electromagnetic motor 76 of the unit lifting and lowering device 74 which moves the electronic component in the up-down directions and the electromagnetic motor 80 of the turning device 78 which adjusts the holding orientation of the electronic component are operated in synchronization. Therefore, the synchronization in the operations of the electromagnetic motor 76 and the electromagnetic motor 80 of the mounting head 26 is secured according to the network which is used in the control of the mounting head 26, that is, according to the second communication protocol of the network which is formed of the cable 112 which is used in the transmission of control signals and the like to the mounting head 26, and the drive circuits 106 of the mounting head 26.

In detail, the control signals are transmitted from the controller 102 to the drive circuits 106 corresponding to the mounting head 26 every specific cycle. However, for example, in a case in which control signals are transmitted from the controller 102 to the drive circuits 106 corresponding to the mounting head 26 at the time t1, the drive circuits 106 receive the control signals as input signals, and transmit output signals to the electromagnetic motors 76 and 80 of the mounting head 26. In this case, the drive circuit 106 transmits a control signal to the electromagnetic motor 80 according to the second communication protocol at a time t5, and transmits a control signal to the electromagnetic motor 76 at a time t6 (>t5). In the same manner as in the electromagnetic motors 52 and 54 of the moving device 24, this is caused by the activation delay or the like of the motors, and the drive circuits 106 transmit to each of the electromagnetic motors 76 and 80 with shifted output times according to the second communication protocol. Accordingly, the electromagnetic motors 76 and 80 start operating at a time t7, and the electromagnetic motor 76 and the electromagnetic motor 80 of the mounting head 26 operate in synchronization.

<Synchronization Between Electromagnetic Motor of Moving Device and Electromagnetic Motor of Mounting Head>

As described above, due to the drive circuits 106 shifting the output times to the electromagnetic motor 52 and the like according to each of the communication protocols, it is possible to synchronize the operations of the electromagnetic motors 52 and 54 in the moving device 24 with the operations of the electromagnetic motors 76 and 80 of the mounting head 26. However, although each of the operations of the electromagnetic motors in the network of the moving device 24 and the operations of the electromagnetic motors in the network of the mounting head 26 are synchronized, the operations of the electromagnetic motors in the network of the moving device 24 are not synchronized with the operations of the electromagnetic motors in the network of the mounting head 26. Specifically, even though the control signals from the controller 102 are output to the drive circuits 106 of the moving device 24 and the drive circuits 106 of the mounting head 26 at the same time (t1), the electromagnetic motors 52 and 54 of the moving device 24 start operating at the time t4, and the electromagnetic motors 76 and 80 of the mounting head 26 start operating at the time t7. It is not possible to synchronize the operations of the electromagnetic motors in the network of the moving device 24 with the operations of the electromagnetic motors in the network of the mounting head 26 merely by depending on the communication protocols of each network in this manner.

Therefore, in the mounting machine 16, the operations of the electromagnetic motors in the network of the moving device 24 are synchronized with the operations of the electromagnetic motors in the network of the mounting head 26 with shifted output times of the control signals from the controller 102 to the drive circuit 106 of each of the networks. Specifically, first, the time (hereinafter, there are cases in which this is described as the "required time") from when the controller 102 outputs the control signals until the electromagnetic motors in each network start operating is acquired. The required time is the total time of the time (hereinafter, there is a case in which this is described as the "output handling time") from when the controller 102 outputs the control signal until the drive circuit 106 outputs the control signal, and the time (hereinafter, there is a case in which this is described as the "operation handling time") from when the drive circuit 106 outputs the control signal until the electromagnetic motor 52 or the like starts operating. The output handling time varies due to the specification or the like of the communication protocol for each of the networks and the drive circuit 106 which is used for each of the networks, and is estimated based on actual measurement or the specification or the like of the communication protocol and the drive circuit 106. The operation handling time varies due to activation delay or the like of the electromagnetic motors which are used in the network, and is estimated based on actual measurement or the specification or the like of the electromagnetic motor. Note that, the controller 102 includes a required time memory section (refer to FIG. 3) 120, and the required time, in which the output handling time is added to the operation handling time, for each network is stored in the required time memory section 120.

When the controller 102 controls the operations of the electromagnetic motors in the plurality of networks, the required time in each of the plurality of network is acquired from the required time memory section 120, and the differences (hereinafter, there is a case in which this is described as the (shift time)) between the required times in the plurality of networks are calculated. Specifically, for example, when controlling the operation of the electromagnetic motor 52 and the like of the moving device 24 and the electromagnetic motor 72 and the like of the mounting head 26, the required time in the network of the moving device 24 and the required time in the network of the mounting head 26 are acquired, and the difference between the required time in the network of the moving device 24 and the required time in the network of the mounting head 26 is calculated as the shift time.

In this case, for example, in a case in which the required time in the network of the moving device 24 is longer than the required time in the network of the mounting head 26 and the shift time is dt, the controller 102 outputs the control signals to the drive circuits 106 of the mounting head 26 when the time dt has elapsed after outputting the control signals to the drive circuits 106 of the moving device 24. Accordingly, it is possible to synchronize the operations of the electromagnetic motors in the network of the moving device 24 with the operations of the electromagnetic motors in the network of the mounting head 26.

Figure 5:
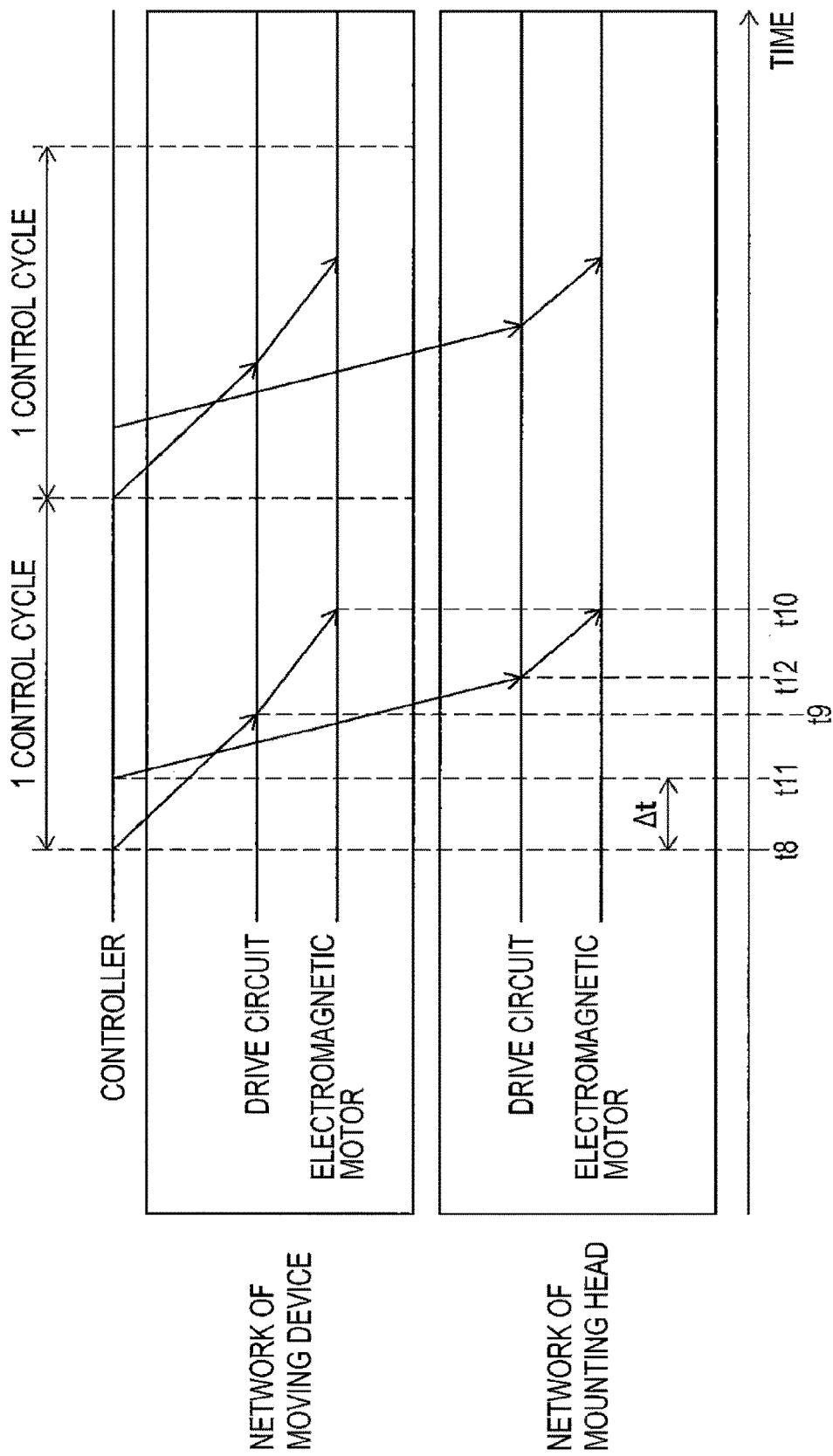
FIG. 5 is a diagram schematically illustrating a transmission mode of control instructions to a plurality of electromagnetic motors in a network of the present disclosure.

Specifically, for example, as illustrated in FIG. 5, in a case in which the control signals are transmitted from the controller 102 to the drive circuits 106 corresponding to the moving device 24 at a time t8, when the drive circuits 106 receive the control signals as input signals, the drive circuits 106 transmit the control signals to the electromagnetic motor 52 and the like at a time t9. The time from the time t8 to the time t9 is the output handling time in the network of the moving device 24. The electromagnetic motor 52 and the like start operating at the time $t_{10}$ according to the control signals from the drive circuits 106. The time from the time t9 to the time t10 is the operation handling time in the network of the moving device 24, and the time from the time t8 to the time t10 is the required time in the network of the moving device 24.

The controller 102 transmits control signals to the drive circuits 106 corresponding to the mounting head 26 at a time (t11) at which dt has elapsed from the time (t8) at which the control signals were transmitted to the drive circuits 106 corresponding to the moving device 24. When the drive circuits 106 receive the control signals as input signals, the drive circuits 106 transmit the control signals to the electromagnetic motor 72 and the like of the mounting head 26 at a time t12. The time from the time t11 to the time t12 is the output handling time in the network of the mounting head 26. The electromagnetic motor 72 and the like start operating at a time t10 according to the control signals from the drive circuits 106. The time from the time t12 to the time t10 is the operation handling time in the network of the mounting head 26, and the time from the time t11 to the time t10 is the required time in the network of the mounting head 26.

In this manner, by shifting the output times of the control signals to each of the drive circuits 106 of the moving device 24 and the drive circuits 106 of the mounting head 26 by the shift time (dt) between the required time in the network of the moving device 24 and the required time in the network of the mounting head 26, the electromagnetic motor 52 and the like of the moving device 24 start operating at the same time as the electromagnetic motor 72 and the like of the mounting head 26. Accordingly, it is possible to synchronize and operate the electromagnetic motor 52 and the like in the network of the moving device 24 and the electromagnetic motor 72 and the like in the network of the mounting head 26.

Note that, as illustrated in FIG. 3, the controller 102 is provided with a shift time calculating section 122 and a control signal output section 124 in addition to the required time memory section 120. The shift time calculating section 122 is a functional section which calculates the differences between the required times in a plurality of networks as shift times. The control signal output section 124 is a functional section which shifts the control signals to each of the drive circuits 106 in the plurality of networks by the shift time amounts and outputs the shifted control signals.

Incidentally, in the example described above, the mounting machine 16 is an example of a manufacturing work machine. The moving device 24 is an example of a head moving device. The mounting head 26 is an example of a work head. The frame section 30 is an example of a base. The electromagnetic motors 52, 54, 76, and 80 are examples of actuators. The suction nozzle 62 is an example of a work tool. The unit lifting and lowering device 74 is an example of an up-down direction moving device. The turning device 78 is an example of an operation device. The control device 100 is an example of a control device. The drive circuit 106 is an example of a drive circuit. The required time memory section 120 is an example of a required time acquisition section. The shift time calculating section 122 is an example of a shift time calculating section. The control signal output section 124 is an example of a control instruction output section.

Note that, the present disclosure is not limited to the example described above, and it is possible to carry out the present disclosure in various modes subjected to various modifications and improvements based on the knowledge of a person skilled in the art. Specifically, for example, in the example described above, the network is formed of the cables 110 and 112, the drive circuits 106, the electromagnetic motor 52, and the like; however, it is possible to adopt a network which is formed of I/O ports for performing transmission and reception of data, and cables for transmitting data to the I/O ports. In a case in which this network is adopted in the present disclosure, it is possible to synchronize the output timing of data from the I/O ports of a plurality of networks.

In the example described above, each of the operations of the moving device 24 and the mounting head 26 are controlled by different networks from each other; however, it is possible to control each of the devices of an inner portion of the mounting head 26 or the like, for example, each of operations of the unit lifting and lowering device 74 and the turning device 78 using different networks from each other. In this case, it is possible to synchronize the operations of the electromagnetic motor 76 of the unit lifting and lowering device 74 with the operations of the electromagnetic motor 80 of the turning device 78 using the technique of the present disclosure.

In the example described above, the technique of the present disclosure is applied to the mounting machine 16 for executing the mounting operation; however, it is possible to apply the technique of the present disclosure to a device for executing various work on a circuit board. In detail, for example, it is possible to apply the technique of the present disclosure to a device for applying cream solder or the like to a circuit board, a device for fluxing a glue or the like onto a circuit board, a device for subjecting a circuit board to various processes, or the like. The technique of the present disclosure is not limited to a device which performs work on a circuit board, and it is possible to apply the technique of the present disclosure to various work machines which are used in manufacturing work.

REFERENCE SIGNS LIST

16: mounting machine (manufacturing work machine), 24: moving device (head moving device), 26: mounting head (work head), 30: frame section (base), 52: electromagnetic motor (actuator), 54: electromagnetic motor (actuator), 62: suction nozzle (work tool), 74: unit lifting and lowering device (up-down direction moving device), 76: electromagnetic motor (actuator), 78: turning device (operation device), 80: electromagnetic motor (actuator), 100: control device, 106: drive circuit, 120: required time memory section (required time acquisition section), 122: shift time calculating section, 124: control signal output section (control instruction output section).

The invention claimed is:

1. A control device which outputs control instructions at a constant cycle to a first network and a second network for executing a predetermined process according to the control instructions, the control device comprising:
- a required time acquisition section that acquires a first required time, which is a time from when a control instruction is output to the first network until the predetermined process is executed by the first network, and a second required time, which is a time from when the control instruction is output to the second network until the predetermined process is executed by the second network;
- a shift time calculating section which calculates a shift time which is a difference between the first required time and the second required time; and
- a control instruction output section which outputs the control instruction to the first network, and, when the shift time has elapsed after the control instruction is output to the first network, outputs the control instruction to the second network,
- wherein the second required time is shorter than the first required time,
- wherein the first network includes a first electromagnetic motor and the second network includes a second electromagnetic motor,
- wherein the control device controls both the first electromagnetic motor of the first network and the second electromagnetic motor of the second network, and
- wherein the control instruction output section outputs the control instruction to the second network after the shift time has elapsed after the control instruction is output to the first network such that operations of the first electromagnetic motor and the second electromagnetic motors based on the control instructions output by the control instruction output section are synchronized.

2. The control device according to claim 1,
wherein communication protocols of the plurality of networks are different from each other.

3. The control device according to claim 1,
wherein each of the first network and the second network includes a drive circuit which receives the control instruction as an input signal, and an actuator which operates according to an output signal from the drive circuit, and
wherein the required time acquisition section acquires, as the first required time, a total time of a time from when the control device outputs a control instruction until the drive circuit of the first network receives the input signal and a time from when the drive circuit of the first network outputs the output signal until the actuator of the first network operates, and acquires, as the second required time, a total time of a time from when the control device outputs a control instruction until the drive circuit of the second network receives the input signal and a time from when the drive circuit of the second network outputs the output signal until the actuator of the second network operates.

4. The control device according to claim 1,
wherein one of the first network and the second network is used in control of a work head which performs work in a manufacturing work machine, and
wherein the other of the first network and the second network is used in control of a head moving device which moves the work head to an arbitrary position on a base of the manufacturing work machine.

5. The control device according to claim 1,
wherein one of the first network and the second network is used in control of an up-down direction moving device that moves a work tool of a work head which performs work in a manufacturing work machine in up-down directions, and
wherein the other of the first network and the second network is used in control of an operation device which operates the work tool in a different mode from an operation mode of the up-down direction moving device.

* * * * *